United States Patent

[11] 3,609,430

| [72] | Inventor | James F. Buffington<br>R.R. # 3, Plymouth, Ind. 46563 |
|---|---|---|
| [21] | Appl. No. | 864,979 |
| [22] | Filed | Oct. 9, 1969 |
| [45] | Patented | Sept. 28, 1971 |

[54] ARMATURE WITH HIGH RESISTANCE END RINGS AND HEAT DISSIPATION ARRANGEMENT
2 Claims, 4 Drawing Figs.

[52] U.S. Cl. .................................................... 310/265
[51] Int. Cl. .................................................... H02k 1/22
[50] Field of Search .................................................... 310/166,
167, 72, 105, 124, 125, 159, 160, 161, 174, 176, 211, 212, 262, 261, 264, 265

[56] References Cited
UNITED STATES PATENTS

| 1,594,205 | 7/1926 | Kirkpatrick | 310/211 |
| 1,708,909 | 4/1929 | Spencer | 310/212 |
| 2,200,126 | 5/1940 | Smith | 310/211 |
| 2,286,008 | 6/1942 | Pfalzgraff | 310/211 |
| 3,153,162 | 10/1964 | Anthony | 310/105 |
| 3,194,996 | 6/1965 | Lynn | 310/211 |
| 3,502,924 | 3/1970 | Staebler | 310/211 |

*Primary Examiner*—Milton O. Hirshfield
*Assistant Examiner*—R. Skudy
*Attorneys*—Hobbs & Green and Kemon, Palmer and Estabrook ABSTRACT: An armature including high-resistance end rings and a disk-shaped member located on each of the two ends of the core of the armature for obtaining an efficient starting and smooth running motor and increasing the life of the motor. The end rings are of a smaller diameter than the core of the rotor.

PATENTED SEP 28 1971　　　　　　　　　　　3,609,430

INVENTOR.
JAMES F. BUFFINGTON
BY Hobbs & Green
ATTORNEYS

ARMATURE WITH HIGH RESISTANCE END RINGS AND HEAT DISSIPATION ARRANGEMENT

In modern industrial and farm facilities there are presently employed a large number of motors powered by alternating current, the majority of which employ rotors of the squirrel cage type. These motors are relatively inexpensive to buy, install, and service and may be designed for single phase or polyphase power systems. There are two common types of systems for running these motors from a single-phase power source, namely, the capacitor-start system and the capacitor-run system. The capacitor-start system has high starting torque, but for starting the motor it employs expensive capacitors and a type of switch known as a centrifugal switch which is unreliable and prone to failure. The capacitor-run system, on the other hand, employs neither the expensive starting capacitors nor the centrifugal switch, but has the disadvantage of having low starting torque.

In polyphase power systems, squirrel cage motors have a high starting torque, and do not require the capacitors, but all squirrel cage motors have the additional problems of requiring large amounts of power for starting, necessitating large power facilities and unduly heavy wiring, and in addition, being subject to large speed variations when sudden loads are applied. Further, they are likely to lurch suddenly when power is first applied due to the large inrush of current, this lurching sometimes causing damage to machinery attached to the motors.

When squirrel cage motors are employed in rotary phase converter systems, i.e. systems which convert single-phase power to three-phase power, the aforementioned speed variations can prevent the machinery attached to the converters from reaching operating speed, and both the converters and the machinery will draw an excessive amount of current, with the results that the equipment may overheat and will operate inefficiently, and the cost of power for a given amount of work will be excessive. It is therefore one of the principal objects of the present invention to minimize the speed fluctuation caused by the sudden application of a load in systems utilizing motors or rotary transformers of the squirrel cage type, and to reduce the starting current of motors of the squirrel cage type, without sacrificing starting torque.

Still another object of this invention is to provide a system which will minimize or prevent rough and possibly damaging starting characteristics of motors of this type, and which will bring about a reduction in the cost of manufacture and repair of squirrel cage motors through the elimination of costly and unreliable parts, without impairing the efficiency of the motors.

Additional objects and advantages will become apparent from the following description and accompanying drawing wherein.

Figure 4:
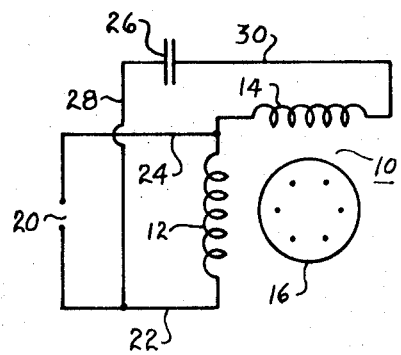
FIG. 4 is equivalent to the circuit of FIG. 3, but employing the present modified motor system.

Referring more specifically to the drawing, numeral 10 designates generally an alternating current AC motor having stator windings 12 and 14, and a squirrel cage armature 16 embodying the present invention. The circuit shown in FIG. 4 is for installations having a single-phase power source, the power entering the circuit at input terminal 20 and flowing through lines 22 and 24 to energize winding 12. In order for torque to be produced by the motor, winding 14 must receive current with a phase different from that received by winding 12. For this purpose, phase-shift capacitor 26 is connected between lines 28 and 30, and power passing through winding 14 is shifted in phase sufficiently to cause torque to be produced by the motor.

Figure 3:
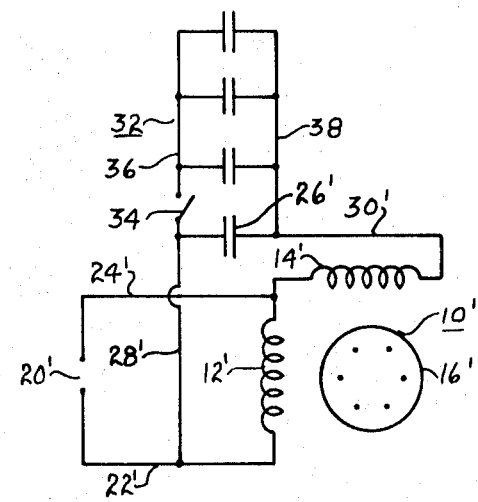
FIG. 3 is a schematic diagram of a typical capacitor-run type of installation employing a conventional squirrel cage motor.

Ordinarily, when a motor wired in the configuration shown in FIG. 4 starts, it requires a substantially greater quantity of power than it does while running at operating speed. During starting conditions, the phase shift capacitor presents a relatively high impedance to the circuit and little current will flow through the circuit. Most of the current will at such times flow through the armature winding not containing the capacitor, and insufficient torque will be developed for proper starting of the motor. In the past, circuitry such as that shown in FIG. 3 was required. Parts shown in FIG. 3 which correspond to those in FIG. 4 have been labeled with the corresponding primed number. In order to increase the current flow through winding 14' during starting, capacitor bank 32 is provided. At low motor speeds, centrifugal switch 34 closes, connecting capacitor bank 32 by means of lines 36 and 38 in parallel with capacitor 26', effectively increasing the capacitance in the power line to stator winding 14'. This increased capacitance permits a larger quantity of power to flow through winding 14' so that sufficient torque is developed during the starting of the motor to obtain efficient self-starting characteristics.

Figure 1:
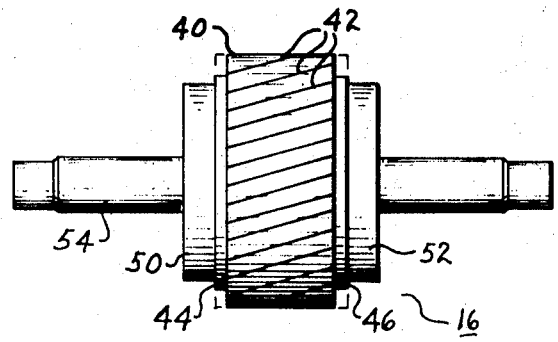
FIG. 1 is a side elevational view of a squirrel cage rotor embodying the present invention.
Figure 2:
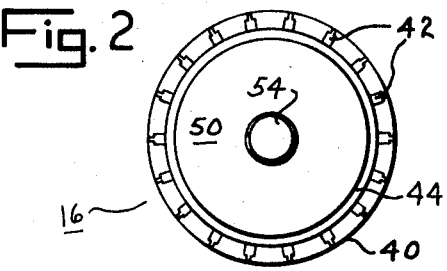
FIG. 2 is an elevational view of one of the ends of the rotor shown in FIG. 1.

The present invention employs a new means of increasing current flow in the second stator winding. Referring now to FIGS. 1 and 2, armature 16 consists of a main body 40, composed of laminated iron or steel plates and having armature windings 42 distributed around the surface and near subsurface portion of body 40, the windings 42 preferably being made of cast aluminum, although other metals may be used. The windings are joined together at the ends of the main body 40 by end rings 44 and 46 which are substantially smaller in size than are normally used and which have a relatively high resistance to the flow of current. During the starting of the motor, current surges into stator winding 12, inducing eddy currents in rotor winding 42. As long as the rotor is not rotating or is only rotating slowly, the motor system is electrically similar to a short circuit. But by employing high-resistance end rings in the rotor, the system impedance is increased, the power consumption is reduced with little loss of torque, and the effective capacitance of phase-shift capacitor 26 is increased, and the motor self-starts, without the necessity of employing the capacitor bank 32 shown in FIG. 3. In addition, the current-limiting function of the high-resistance end rings greatly reduces lurching when the motor starts.

In order to further reduce the lurching, heavy disk-shaped members 50 and 52 mounted on shaft 54 on either side of end rings 44 and 46 are employed. These members, which may be constructed of any heavy material such as lead, provide greater inertia for smoother starting characteristics, and greater momentum for maintaining constant speed under rapidly changing loading conditions. In rotary phase converter systems, sudden application of a load, such as that presented when a motor is turned on, creates a large current drain from the rotary transformer of the phase converter, with a concomitant slowing down of the transformer. This results in a decreased capacity to handle the extra load and, if the load is excessively heavy, neither the rotary transformer nor the motor attached thereto will be able to reach proper operating speeds. However, with the addition of end members 44 and 46 to the armature of the rotary phase converter, shock load handling capability is increased. Further, the high-resistance end rings, effectively increasing the apparent capacitance in the converter system, aid in producing a large phase shift.

By decreasing the starting current and by limiting the overload caused by sudden applied load, the present invention allows motors and phase converters to run at a cooler temperature and higher efficiency, thus increasing the time period during which the motor may safely be run, and at the same time increasing the life expectancy of the motor. Further, since the motor employing this invention runs cooler, cast aluminum cooling fins usually mounted on one end of the rotor body may be replaced by a simple light-duty fan, thus reducing the cost of manufacture. While the additional weight resulting from members 50 and 52 tends to increase the starting time and hence tends to increase the temperature of end rings 44 and 46, along with the temperature increase resulting from the increased electrical resistance, the mass of members 50 and 52 rapidly absorbs the heat from rings 44 and 46 and maintains optimum starting and operating conditions in the rotor.

While only one embodiment of the present squirrel cage armature has been described herein, various changes and modifications may be made without departing from the scope of the invention.

I claim:

1. An armature comprising a cylindrically shaped core of laminated metal plates, said core having transverse grooves on its periphery, a plurality of windings in said grooves, high-resistance end rings at each end of said core connecting said windings electrically in parallel and being of a diameter substantially less than said core, a shaft coaxial to said core and protruding from both ends thereof and a disk-shaped plate of high-density material on said shaft at each end of said core in axial alignment therewith, for improving the inertial of the armature and for dissipation of heat generated during the operation of the armature from said end rings, said end rings extending axially outwardly from said windings and being disposed between said disk-shaped plates and said core.

2. An armature as defined in claim 1 in which said disk-shaped plates are constructed of lead.